United States Patent
Pallett et al.

[11] Patent Number: 5,685,277
[45] Date of Patent: Nov. 11, 1997

[54] FUEL INJECTOR CUTOUT OPERATION

[75] Inventors: Tobias John Pallett, Ypsilanti; Eric Matthew Storhok, Ann Arbor, both of Mich.

[73] Assignee: Ford Global Technologies, Inc., Dearborn, Mich.

[21] Appl. No.: 639,664

[22] Filed: Apr. 29, 1996

[51] Int. Cl.$^6$ .......................... F02D 17/02; F02D 11/10
[52] U.S. Cl. .......................... 123/481; 123/396
[58] Field of Search .......................... 123/396, 399, 123/479, 481

[56] References Cited

U.S. PATENT DOCUMENTS

| | | | |
|---|---|---|---|
| 4,541,387 | 9/1985 | Morikawa | 123/481 |
| 4,779,597 | 10/1988 | Takaku et al. | 123/479 |
| 5,038,739 | 8/1991 | Ishii | 123/481 |
| 5,092,298 | 3/1992 | Suzuki et al. | 123/361 |
| 5,325,832 | 7/1994 | Maute et al. | 123/396 |
| 5,368,000 | 11/1994 | Koziara | 123/481 |
| 5,370,094 | 12/1994 | Sorg et al. | 123/399 |
| 5,408,974 | 4/1995 | Lipinski et al. | 123/481 |
| 5,429,090 | 7/1995 | Kotchi et al. | 123/396 |
| 5,503,129 | 4/1996 | Robichaux et al. | 123/481 |
| 5,555,871 | 9/1996 | Gopp et al. | 123/481 |
| 5,579,736 | 12/1996 | Nakamura et al. | 123/481 |

*Primary Examiner*—Willis R. Wolfe
*Attorney, Agent, or Firm*—Peter Abolins

[57] ABSTRACT

This invention includes a method of controlling an internal combustion engine to control power output during a throttle positioning error. The method includes comparing an inferred load at standard temperature and pressure from actual throttle position to a desired load at standard temperature and pressure from a desired throttle position. This comparison determines how many injectors to shut off in order to reduce engine output power when the throttle is open further than desired.

6 Claims, 2 Drawing Sheets

FUEL INJECTOR CUTOUT OPERATION

BACKGROUND OF THE INVENTION

1. Field of the Invention

This invention relates to electronic engine control of an internal combustion engine.

2. Prior Art

Torque reduction using injector cutout and spark retard is known in connection with speed limiting and traction assist control. U.S. Pat. No. 4,779,597 teaches a means for controlling fuel flow or secondary air in the event of a stuck throttle when operating an internal combustion engine. Similarly, U.S. Pat. No. 5,325,832 issued to Maute et al. also teaches an emergency driving function in the event of a fixed or disabled throttle.

While these and other patents teach maintaining some vehicle drivability in the event of a fixed throttle, there is still a need for improved failure mode operation of an internal combustion engine. Thus, it is still desirable to improve reduction of engine output power. This is one of the problems this invention overcomes.

SUMMARY OF THE INVENTION

Applicants' invention includes using injector cut out to control power output during the occurrence of a throttle positioning error. A comparison of inferred actual load from actual throttle position to desired load from desired throttle position determines how many injectors to shut off in order to reduce engine output power when the throttle is opened further than desired. The strategy infers the sea level loads of an engine at standard temperature with current throttle position and the sea level load at standard temperature of the same engine with desired throttle position. The strategy takes the ratio of the two loads to determine how many cylinders to shut off by a fuel cutout. This is used as part of the electronic throttle control engine control strategy to provide limp home capability.

In general, during this description, the predicted actual and desired loads mentioned are standard temperature and pressure load predictions, i.e. sea level (29.9 inches of Hg) and standard temperature (100° F.).

In particular, this invention includes a method for determining how many fuel injectors to cut out when operating an internal combustion engine. The accelerator pedal position is sensed and then a desired throttle position is determined from the pedal input and other engine parameters (i.e. cruise, idle, etc.). From the desired throttle position a desired predicted load can be determined. The actual predicted sea level load at standard temperature is also determined. The actual throttle position is sensed and a predicted actual sea level load at standard temperature is determined based on the actual throttle position. The ratio of desired sea level load to the predicted actual sea level load can be used to determine a percentage of load, which is proportional to the actual engine torque output. This load percentage is then used to determine a percentage of the total number of cylinders required to produce the desired sea level load. Such a method has an advantageous simplicity because there is no need to compute engine torque and does not require modifiers to spark advance.

DETAILED DESCRIPTION OF THE INVENTION

To allow a driver to control a vehicle to limp home with a malfunctioning throttle, engine output must be regulated by means other than air flow. One way to do this is to shut off a selected number of fuel injectors. For this strategy, the engine controller interprets the driver demand, via the pedal sensors and other driver inputs and engine parameters, and compares this with the engine output from the actual throttle. The ratio of these values will indicate how many injectors to turn off.

This logic first predicts a potential sea level load at standard temperature using the existing sea level load functions, engine speed, and actual throttle position. Using the pedal position sensor and other inputs of engine parameters, the logic then determines the desired throttle position. This is used to calculate desired sea level load using existing sea level load functions and engine speed. Next, the ratio of the predicted desired sea level load and the predicted actual sea level load is calculated and multiplied by the number of total engine cylinders, which results in the number of cylinders which should be running. If this number is greater than the total number of cylinders, then no fuel injector cutout is required. If it is less than the total, then the number of injectors desired is rounded down to the nearest whole number (i.e., 4.7 injectors desired, only 4 operate). Another means for determining the number of injectors to turn off is to use a table lookup with inputs including the predicted actual sea level load and the predicted desired sea level load.

Figure 1:
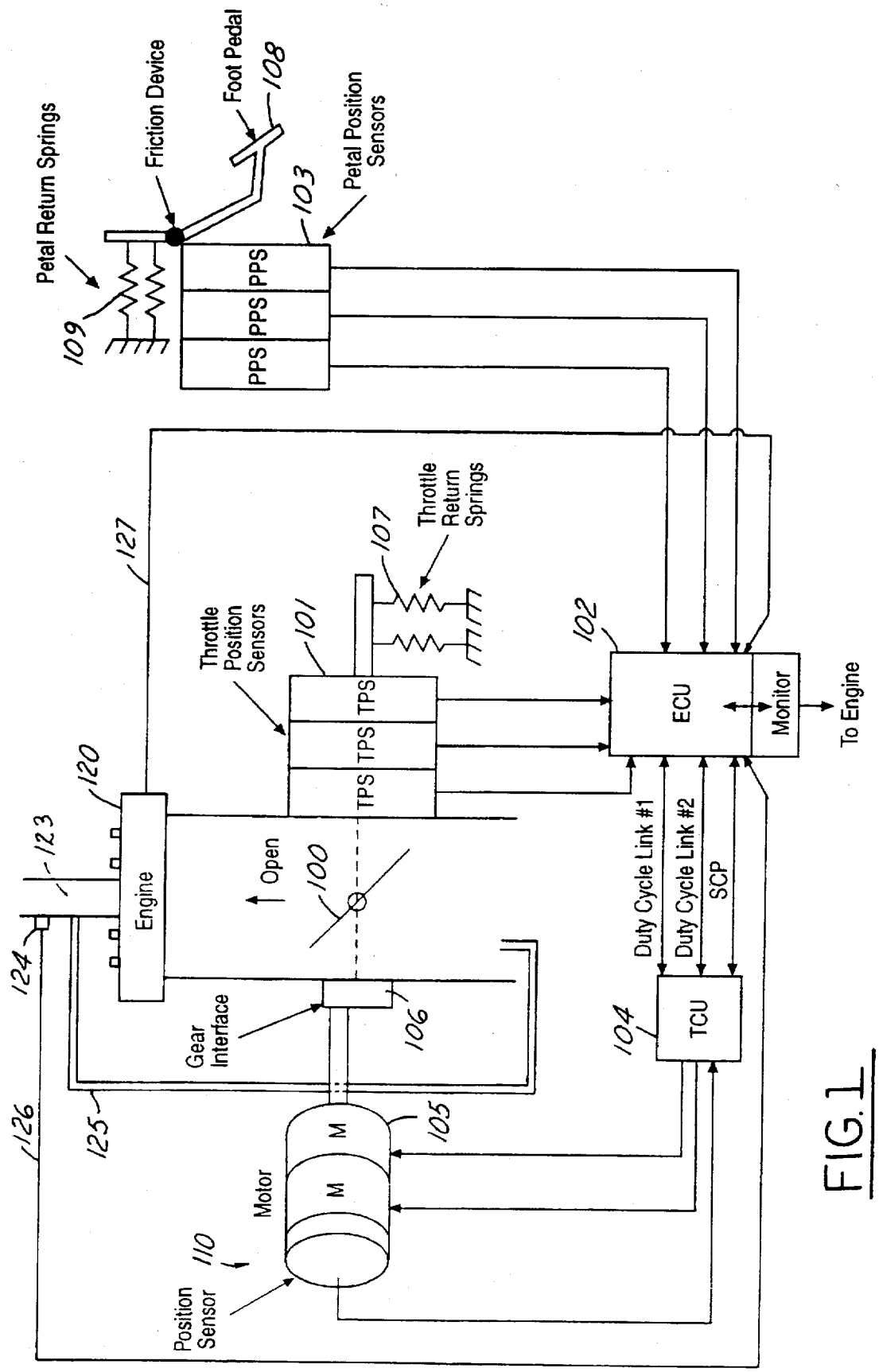
FIG. 1 is a block diagram of an internal combustion engine with an electronically controlled throttle in accordance with an embodiment of this invention.

Referring to FIG. 1, an electronic throttle control system includes a throttle 100 which is coupled to throttle position sensors 101. Sensors 101 produce a signal indicating throttle position and apply it to an electronic control module (ECU) 102. Throttle return springs 107 are coupled to throttle 100 and act to bias throttle 100 in one direction. ECU 102 also has inputs from pedal position sensors 103 which are coupled to a foot pedal 108. Pedal return springs 109 act to apply a biasing force. ECU 102 is coupled to a throttle drive motor 105 through a throttle control unit (TCU) 104. A position sensor 110 is coupled to motor 105 and provides a signal to TCU 104 indicating throttle position. Motor 105 is coupled to throttle 100 through a gear interface 106. An engine 120 is coupled to throttle 100 and includes injectors 121. The output of engine 120 is an exhaust path 123. Exhaust path 123 includes an exhaust gas oxygen sensor 124 and an exhaust gas recirculation path 125 providing a return path for exhaust gas back to the input of throttle 100. A data feedback path 126 is coupled from exhaust gas oxygen sensor 124 to ECU 102. A data feedback path 127 is coupled from engine 120 to ECU 102.

Figure 2:
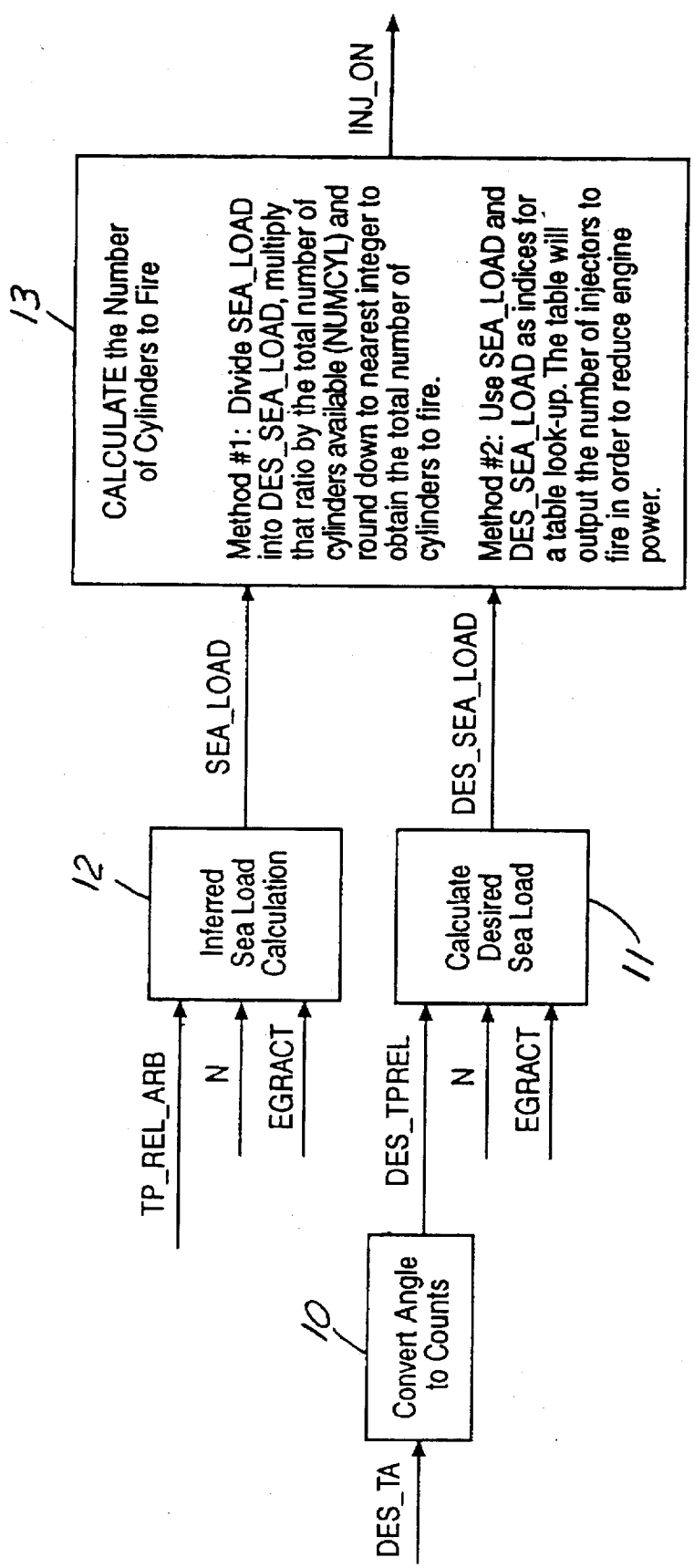
FIG. 2 is a logic block diagram of an electronic throttle control injector cut out process in accordance with an embodiment of this invention.

Referring to FIG. 2, a block 10 converts an angle to counts and receives an input DES_TA (desired throttle angle). An output DES_TPREL (desired relative throttle position) from block 10 is applied to block 11 which calculates desired sea load (DES_SEA_LOAD, or engine load at sea level). Block 11 also receives an input N (engine speed) and an input EGRACP (exhaust gas recirculation actual percentage). The output of block 11 is DES_SEA_LOAD and is applied to a block 13. A block 12 infers SEA LOAD calculation and has inputs of TP_REL_ARB, N, and EGRACT, wherein TP_REL_ARB is relative throttle position. The output of block 12 is SEA_LOAD and is applied to block 13. Block 13 calculates the number of cylinders to fire. A first method divides SEA LOAD into DES_SEA_LOAD (desired engine load at sea level), multiplies that ratio by the total number of cylinders available and rounds down to the nearest integer to obtain the total number of example, at idle it can be determined as a function of engine speed and at cruise it can be determined as a function of vehicle speed.

---

DES_TPREL = FNTATOTP(DES_TA)
DES_SEA_LOAD = FN1036A(N,DES_TPREL)-EGRACT/10*FN1037(N,DES_TPREL)
PERCENT_DES_LOAD = DES_SEA_LOAD/SEA_LOAD - clipped to 1.0 if > 1.0.
NUM_CYL_ON = NUMCYL*PERCENT_DES_LOAD; Rounded down to the nearest whole integer.

--- cylinders to fire. In a second method, SEA LOAD and DES_SEA_LOAD as indices are used for a table lookup. The table will output the number of injectors to fire in order to reduce engine power. The output of block 13 is an injector on (INJ_ON) signal.

In summary, this strategy calculates the engine output as if the engine were operating at sea level and compares that with a driver demand output, again calculated at sea level. If the engine output exceeds the drive demand output a select number of cylinders are shut off.

Comparing a predicted sea level output to a predicted sea level demand should cancel out the effect of altitude and temperature. However, the effect of spark on engine torque is not taken into account. The ratio of desired sea level load to sea level load is compared to the percent of engine output, calculated from the number of injectors firing.

More specifically, this strategy is intended for use with electronic throttle control (ETC) pedal follower systems. The strategy is further described below and will determine the number of injectors to turn off based on a ratio of desired sea level load and inferred actual sea level load.

---

Inputs:

| | |
|---|---|
| EGRACT | Actual EGR rate |
| N | Engine Speed |
| NUMCYL | Number of cylinders an engine has |
| PPS_REL | Relative pedal position |
| TP_REL | Relative throttle position |

Calibration Values:

| | |
|---|---|
| FNOETC2 | Returns DES_TA from PPS1_REL |
| FNTATOTP | Converts throttle angle to throttle position counts |
| FN1036A | Returns a sea level inferred load level from engine speed and TP_REL |
| FN1037 | Returns inferred sea level load correction for EGR |

Outputs:

| | |
|---|---|
| DES_SEA_LOAD | Desired driver load based on sea level calculations of des_tp_rel and engine speed. |
| NUM_CYL_ON | Number of cylinders should be running for fixed throttle running, rounded down to the nearest whole number. |
| PERCENT_DES_LOAD | Ratio of DES_SEA_LOAD and SEA_LOAD |
| SEA_LOAD | Inferred load based on sea level load based on engine speed and tp_rel |

Process:

SEA_LOAD = FN1036A(N,TP_REL) − EGRACT/10*FN1037 (N,TP_REL)
DES_TA = FN0ETC2 (PPS_REL)

---

Note that desired throttle angle can be determined in other ways depending upon the operating state of the engine. For Various modifications and variations will no doubt occur to those skilled in the art to which this invention pertains. Such variations which basically rely on the teaching through which this disclosure has advanced the art are properly considered within the scope of this invention.

We claim:

1. A method of operating an electronic engine controller for an internal combustion engine having more than one cylinder, including the steps of:

calculating the number of cylinders to fire as a function of desired load based upon desired throttle position and actual load based upon actual throttle position;

using actual load desired load as indices for a table lookup; and determining from the table the number of injectors to fire in order to reduce engine power.

2. A method of operating an electronic engine controller for an internal combustion engine including the steps of:

determining the number of cylinders actually firing;

calculating the number of cylinders to fire as a function of desired load based upon desired throttle position and actual load based upon actual throttle position, by dividing desired load by actual load; multiplying the resulting ratio by the total number of cylinders available; rounding down to the nearest integer to obtain the total number of cylinders to fire; and reducing the number of injectors firing upon the detection of an electronic throttle control positioning fault.

3. A method of operating an electronic engine controller for an internal combustion engine having more than one cylinder, including the steps of:

calculating the number of cylinders to fire as a function of desired load based upon desired throttle position and actual load based upon actual throttle position; and wherein the step of calculating includes the steps of:

dividing desired load by actual load;

multiplying the resulting ratio by the total number of cylinders available; and rounding down to the nearest integer to obtain the total number of cylinders to fire.

4. A method of operating an electronic engine controller for an internal combustion engine as recited in claim 3 further comprising the steps of:

determining the number of cylinders actually firing; and reducing the number of injectors firing upon the detection of an electronic throttle control positioning fault.

5. A method of operating an electronic engine controller for an internal combustion engine including the steps of calculating the number of cylinders to fire as a function of desired load based upon desired throttle position and actual load based upon actual throttle position, the method including the steps of:

defining inputs as:

| | |
|---|---|
| EGRACT | Actual EGR rate |
| N | Engine Speed |
| NUMCYL | Number of cylinders an engine has |
| TP_REL | Relative throttle position | defining calibration values as:

| | |
|---|---|
| FNTATOTP | Converts throttle angle to throttle position counts |
| FN1036A | Returns a sea level inferred load level from engine speed and TP_REL |
| FN1037 | Returns inferred sea level load correction or EGR | defining outputs as:

| | |
|---|---|
| DES_SEA_LOAD | Desired driver load based on sea level calculations of des_tp_rel and engine speed |
| NUM_CYL_ON | Number of cylinders should be running for fixed throttle running, rounded down to the nearest whole number. |
| PERCENT_DES_LOAD | Ratio of DES_SEA_LOAD and SEA_LOAD |
| SEA_LOAD | Inferred load based on sea level load based on engine speed and tp_rel; and | using the following processes to determine the number of cylinders to fire:

SEA_LOAD = FN1036A (N,TP_REL) − EGRACT/10*FN1037 (N,TP_REL)
DES_TA = Function of engine operating parameters
DES_TPREL = FNTATOTP (DES_TA)
DES_SEA_LOAD = FN1036A (N,DES_TPREL) − EGRACT/10*FN1037 (N,DES_TPREL)
PERCENT_DES_LOAD = DES_SEA_LOAD/SEA_LOAD
NUM_CYL_ON = NUMCYL*PERCENT_DES_LOAD
  - or -
NUM_CYL_ON = Function (DES_SEA_LOAD, SEA_LOAD).

6. A method of operating an electronic engine controller for an internal combustion engine including the steps of calculating the number of cylinders to fire as a function of desired load based upon desired throttle position and actual load based upon actual throttle position as recited in claim 5, further including the steps of:

defining inputs as:

| | |
|---|---|
| PPS_REL | Relative pedal position, and | using the following process to determine the number of cylinders to fire:

DES_TA = FN0ETC2(PPS_REL), wherein FN0ETC2 is a calibration function.

* * * * *